(12) United States Patent
Wakabayashi et al.

(10) Patent No.: US 9,633,759 B2
(45) Date of Patent: Apr. 25, 2017

(54) WATERPROOFING STRUCTURE FOR INSULATION-COATED ELECTRICAL WIRE, AND WIRE HARNESS

(71) Applicant: SUMITOMO WIRING SYSTEMS, LTD., Mie (JP)

(72) Inventors: Masataka Wakabayashi, Mie (JP); Hiroyuki Ootsuki, Mie (JP); Kazuto Hasegawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/658,714

(22) Filed: Mar. 16, 2015

(65) Prior Publication Data

US 2015/0270029 A1   Sep. 24, 2015

(30) Foreign Application Priority Data

Mar. 20, 2014  (JP) .................... 2014-058699

(51) Int. Cl.
  *H01B 7/282*  (2006.01)
(52) U.S. Cl.
  CPC .................. *H01B 7/282* (2013.01)
(58) Field of Classification Search
  CPC ................ H01B 7/282; H02G 3/02
  USPC ................................. 174/72, 74 A
  See application file for complete search history.

(56) References Cited

U.S. PATENT DOCUMENTS 2,416,943 A * 3/1947 Nicolazzo ............... H01R 4/22
                                                                        174/87
6,090,231 A * 7/2000 Saito ..................... H02G 1/14
                                                                         156/51
2006/0048965 A1* 3/2006 Ootsuki .................. H01R 4/22
                                                                        174/74 A
2014/0284099 A1* 9/2014 Saito .................... H01B 7/2825
                                                                        174/70 R
2015/0068800 A1* 3/2015 Yamasaki ............... B32B 27/18
                                                                        174/72 A

FOREIGN PATENT DOCUMENTS

JP       2000-113917       4/2000
JP       2008-131327       6/2008

* cited by examiner

*Primary Examiner* — Hoa C Nguyen
*Assistant Examiner* — Stanley Tso
(74) *Attorney, Agent, or Firm* — Greenblum & Bernstein, P.L.C.

(57) ABSTRACT

The present invention relates to a waterproofing structure for an insulation-coated electrical wire that includes a tubular protection member and a resin material that is accommodated in the protection member. An exposed conductor section includes a plurality of bare wires bent to double back in a reverse direction in the protection member, the protection member including a tubular section that surrounds the exposed conductor section and the pair of on intermediate ends of the coating tube that are adjacent to both ends of the exposed conductor section; and a closed section that is distanced from the exposed conductor section in the axial direction and closes one end of the tubular section. The resin material is made of a thermosetting resin that is cured, between the protection member and the insulation-coated electrical wire, while closely fitting to the closed section, the exposed conductor section, and the pair of intermediate ends.

4 Claims, 4 Drawing Sheets

WATERPROOFING STRUCTURE FOR INSULATION-COATED ELECTRICAL WIRE, AND WIRE HARNESS

TECHNICAL FIELD

The present invention relates to a waterproofing structure for an insulation-coated electrical wire, and a wire harness, and in particular to a waterproofing structure for an insulation-coated electrical wire that is effectively provided at an intermediate section of the insulation-coated electrical wire, and a wire harness.

BACKGROUND ART

In a wire harness that is mounted in an automobile and the like, it is often the case that a coating of an insulation-coated electrical wire is partially removed to expose a conductor constituted by a group of bare wires, and another electrical wire is connected to the exposed conductor section using welding or a crimping terminal or a connection terminal is crimped to the exposed conductor section. Such an exposed conductor section or an electrical connection section needs reliable waterproofing when it is to be arranged in an area that is exposed to water.

Conventionally, therefore, a branch connecting structure (see, for example, JP 2008-131327A) has been proposed in which a terminal splice section for branching a branch wire from a main wire of a wire harness serving as a communication wire for a vehicle network is accommodated in a resin protection cap, and the protection cap is fixed to ends of coating tubes of the main and branch wires by winding tape in the vicinity thereof or using a heat shrinkable tube or a waterproofing agent.

Furthermore, a waterproof device (see, for example, JP 2000-113917A) has also been proposed in which uncoated exposed core wire sections are formed at intermediate sections of a plurality of coated lead wires that are bent upward in an inverted U-shape, and an insulation tube that has a water resistance and heat resistance and is bent in an inverted U-shape to cover the exposed core wire sections of the plurality of coated lead wires is provided.

JP 2008-131327A and JP 2000-113917A are examples of related art.

SUMMARY OF THE INVENTION

However, the former conventional waterproofing structure for an insulation-coated electrical wire in which the terminal splice section is accommodated in a protection cap cannot be used for waterproofing an intermediate splice section.

On the other hand, the latter conventional waterproofing structure for an insulation-coated electrical wire in which a plurality of coated lead wires having an exposed core wire section are folded in an inverted U-shape can be used for waterproofing the exposed conductor sections at the intermediate sections and intermediate splice sections, but there is the following problem that has not been solved.

That is, in the latter conventional waterproofing structure for an insulation-coated electrical wire, insulation-coated electrical wires having exposed conductor sections formed at the intermediate sections thereof are inserted into the insulation protection tube, and the insulation-coated electrical wires, together with the insulation protection tube, are bent in an inverted U-shape at a position other than the easily-bendable exposed conductor sections, and thus the operation of bending the insulation-coated electrical wires and the insulation protection tube is not easy, resulting in a high manufacturing cost. Furthermore, the bent insulation protection tube may have unevenness or a curve in the vicinity of the exposed conductor sections, or an end of the coating tube that is adjacent to the exposed conductor sections of the insulation-coated electrical wires may easily open, possibly leading a deterioration in waterproofing performance and outer appearance.

Furthermore, in the conventional waterproofing structure for an insulation-coated electrical wire, a terminal splice is formed using resistance welding or the like in the case where, for example, a high waterproofing performance is needed in order to prevent secondary water exposure due to a capillary action and the like through gaps between bare wires within the exposed conductor sections, also resulting in a high manufacturing cost.

The present invention was made in order to solve the above-described problem, and it is an object of the present invention to provide a low-cost waterproofing structure for an insulation-coated electrical wire that can ensure a high waterproofing performance and an excellent workability and outer appearance, and a low-cost wire harness that has a high waterproofing performance and an excellent workability and outer appearance.

In order to achieve the above-described object, a waterproofing structure for an insulation-coated electrical wire according to the present invention includes: a tubular protection member in which an exposed conductor section formed in a part in the longitudinal direction of the insulation-coated electrical wire is accommodated together with ends of a coating tube of the insulation-coated electrical wire that are adjacent to the exposed conductor section; and a resin material that is accommodated in the protection member and cured in a state of covering the exposed conductor section and the ends of the coating tube that are adjacent to the exposed conductor section, wherein the exposed conductor section in the protection member includes a plurality of bare wires that bend so as to double back in a reverse direction, the protection member includes a tubular section that surrounds the exposed conductor section and the pair of intermediate ends of the coating tube that are adjacent to both ends of the exposed conductor section, and a closed section that is distanced from the exposed conductor section in the axial direction and closes one end of the tubular section, the resin material is made of a thermosetting resin that is cured, between the protection member and the insulation-coated electrical wire, while closely fitting to the closed section, the exposed conductor section, and the pair of intermediate ends.

With this configuration, since the insulation-coated electrical wire is bent so as to double back in a reverse direction at the exposed conductor section constituted by the plurality of bare wires, the operation of inserting, into the protection member, the insulation-coated electrical wire bent into two sections, with the exposed conductor section that is doubled back at the tip, can be facilitated. Furthermore, the exposed conductor section of the insulation-coated electrical wire doubles back in a natural manner, and the intermediate ends of the coated tube that are adjacent to both ends of the exposed conductor section are not pressed to contact the protection member in the radial direction. Accordingly, an excellent outer appearance can be achieved. Moreover, the resin member serving as a waterproofing agent can reliably closely fit to the circumferences of the exposed conductor section and the pair of intermediate ends of the coated tube that are adjacent to both ends of the exposed conductor section, and can easily penetrate between the bare wires, making it possible to ensure a predetermined waterproofing performance without welding the bare wires. As a result, it is possible to realize a waterproofing structure for an insulation-coated electrical wire that has an excellent outer appearance and a high waterproofing performance, while achieving a reduction in cost by simplification of the operation of inserting the electrical wire into the protection member.

In the waterproofing structure for an insulation-coated electrical wire according to the present invention, it is preferable that the tubular section of the protection member is constituted by a heat-shrinkable tube that surrounds the pair of intermediate ends of the coated tube and the exposed conductor section, and is shrunk to a predetermined shrunk diameter, and the closed section of the protection member is constituted by a stopper that is closely fitted to the inner diameter of one end side of the heat-shrinkable tube.

With this configuration, it is possible to easily set the inner diameter of the heat-shrinkable tube so as to be suitable for the operation of inserting the electrical wire into the protection member according to the outer diameter of the stopper, while ensuring sufficient adhesion of the one end of the heat-shrinkable tube that is to be shrunk with respect to the stopper. Accordingly, it is possible to ensure a better outer appearance and waterproofing performance.

According to the waterproofing structure for an insulation-coated electrical wire of the present invention, it is preferable that the resin material is made from a layer of a cured thermosetting epoxy resin of a two-component mixture.

With this configuration, a low-viscosity thermosetting epoxy resin of a two-component mixture can be used that has a high adhesion to the circumference of the exposed conductor section and easily penetrates into gaps between the bare wires in the ends of the coating tube and the exposed conductor section before being thermally cured. Therefore, it is possible to configure a reliable resin material that has a high waterproofing performance and a high heat resistance, and is cured in the state of being closely fitted to the circumference of the exposed conductor section and penetrating into gaps between the bare wires in the ends of the coating tube.

A wire harness according to the present invention relates to a wire harness including the above-described waterproofing structure for an insulation-coated electrical wire. With this configuration, a low-cost wire harness that has a high waterproofing performance and an excellent workability and outer appearance is obtained.

According to the present invention, it is possible to provide a low-cost waterproofing structure for an insulation-coated electrical wire that can ensure a high waterproofing performance and an excellent workability and outer appearance, and a low-cost wire harness that has a high waterproofing performance and an excellent workability and outer appearance.

EMBODIMENTS OF THE INVENTION

Hereinafter, embodiments for implementing the present invention will be described.

Embodiment

FIGS. 1 to 4 show an embodiment of a wire harness having a waterproofing structure for an insulation-coated electrical wire according to the present invention. In this embodiment, the waterproofing structure for an insulation-coated electrical wire of the present invention is applied to a single vehicle wire harness that has a waterproofing structure.

First, the configuration of the present embodiment will be described.

Figure 1:
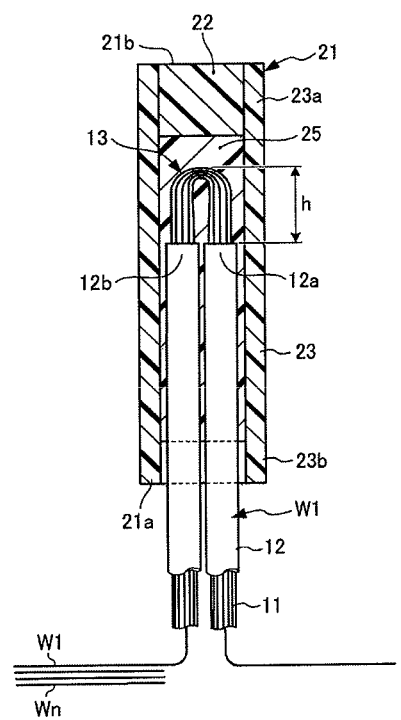
FIG. 1 is a cross-sectional view showing the main section of a wire harness having a waterproofing structure for an insulation-coated electrical wire according to an embodiment of the present invention.

As shown in FIG. 1, in a wire harness 1 that includes a plurality of insulation-coated electrical wires W1 to Wn (n is a natural number that is 2 or more) forming a bundle of electrical wires, the insulation-coated electrical wire W1 has the waterproofing structure for an insulation-coated electrical wire according to the present embodiment.

As shown in FIGS. 1 to 4, the insulation-coated electrical wire W1 is constituted by a conductor 11 in which, for example, a plurality of bare wires 1ie are bundled, and a coating tube 12 that surrounds the conductor 11 concentrically.

The conductor 11 is constituted by a circular stranded wire obtained by twisting together the plurality of bare wires 1ie, which are soft conducting wires, but may not necessarily be a stranded wire. Furthermore, the coating tube 12 is made of an insulation material tube that is formed of a resin made mainly of a vinyl chloride resin for example, and has a circular cross section.

In an intermediate section (a section distanced from both ends) in the length direction of the insulation-coated electrical wire W1, an exposed conductor section 13 is provided that is obtained by stripping and removing an intermediate section of the coating tube 12 within a predetermined length range, and exposing a part of the conductor 11 outwardly of the coating tube 12.

The exposed conductor section 13, together with intermediate ends 12a and 12b of the coating tube 12 that are adjacent to both ends of the exposed conductor section 13, is accommodated in a substantially cylindrical protection member 21 for insulation, heat resistance, and mechanical protection.

Furthermore, the exposed conductor section 13, although the detail thereof is not shown, is such that a plurality of bare wires lie in the protection member 21 bend so as to double back in a reverse direction to form a substantial U-shape.

In the protection member 21, a resin material 25 is provided that is cured into the shape of a bottomed substantial cylinder in a state of covering the exposed conductor section 13, and the intermediate ends 12a and 12b of the coating tube 12 that are adjacent to the exposed conductor section 13, the resin material 25 serving as a waterproofing agent.

This resin material 25 has an outer diameter that is larger than the sum of diameters of a pair of sections of the coating tube 12 that extend from the intermediate ends 12a and 12b of the insulation-coated electrical wire W1 that is bent into two sections at the exposed conductor section 13, and a length in the axial direction that is greater than the protruding height h of the exposed conductor section 13. Furthermore, the protection member 21 has an outer diameter and a length in the axial direction that both are greater than those of the resin material 25.

The protection member 21 includes a tubular section 21a that surrounds the exposed conductor section 13 and the pair of intermediate ends 12a and 12b of the coating tube 12 that are adjacent to both ends of the exposed conductor section 13, and a closed section 21b that is distanced from the exposed conductor section 13 in the axial direction, and closes one end of the protection member 21.

Specifically, the protection member 21 includes a stopper 22 that is located at a predetermined distance in the axial direction from the exposed conductor section 13, and a heat-shrinkable tube 23 that is shrunk to a predetermined shrunk diameter and has an inner circumference on one end 23a side that is closely fitted to the stopper 22.

The heat-shrinkable tube 23 is a tube that is shrunk by heat in the radial direction, and made of a material that is cut from an elongated tube and shrunk to a predetermined shrunk diameter. This heat-shrinkable tube 23 is a well-known heat-shrinkable tube that is shrunk to a predetermined shrunk diameter such that the inner diameter after heat shrinkage is approximately half of the inner diameter before heat shrinkage.

The stopper 22 has the outer diameter that is larger than the shrunk diameter that corresponds to the shrinkage limit of the heat-shrinkable tube 23, and is closely fitted to the inner diameter of the one end 23a of the heat-shrinkable tube 23. Note that, in this context, the shrunk diameter of the heat-shrinkable tube 23 is an inner diameter in the radial direction of the inner circumference of the one end 23a of the heat-shrinkable tube 23, which is approximately the same as the outer circumference of the stopper 22.

Furthermore, the stopper 22 has a transverse cross section in the shape of, for example, a circle, but may also have a transverse cross section in the shape of an ellipse or another noncircular cross section. Moreover, the stopper 22 may also be provided, on its outer circumference, with a circular rib, a flange, a circular groove, or the like, or may also have a longitudinal cross section in the shape of a frustum.

The stopper 22 is made of a polyolefin system resin, such as polypropylene (PP) or polyethylene (PE). Furthermore, the heat-shrinkable tube 23 is made of a polyolefin system resin, such as polypropylene (PP) or polyethylene (PE). Accordingly, when the heat-shrinkable tube 23 is shrunk to a predetermined shrunk diameter that approximates the shrinkage limit, so as to closely fit to the outer circumference of the stopper 22 in a liquid-tight manner, heat seal properties on the outer circumference of the stopper 22 can be anticipated.

The resin material 25 is made of a thermosetting resin that is cured, between the protection member 21 and the insulation-coated electrical wire W1, while closely fitting to the stopper 22, the exposed conductor section 13, and the pair of intermediate ends 12a and 12b.

Furthermore, the resin material 25 is made from a layer obtained by heating and curing a low-viscosity thermosetting epoxy resin of a two-component mixture. "Low-viscosity" means a viscosity to the extent that a flowable thermosetting epoxy resin of a two-component mixture before being heated and cured has a high adhesiveness to the circumference of the exposed conductor section 13, and easily penetrates into gaps g1 and g2 (see FIG. 4) between the bare wires 11e in the intermediate ends 12a and 12b of the coating tube 12.

Therefore, the resin material 25 forms, between the protection member 21 and the insulation-coated electrical wire W1, an one end face 25a that closely fits to the stopper 22, and is cured while penetrating into the gaps g1 in the intermediate ends 12a and 12b that are formed between the exposed conductor section 13 and the corresponding one of the pair of the intermediate ends 12a and 12b of the coating tube 12 on both end sides of the exposed conductor section 13, and into the gaps g2 formed between the electrical wires within the exposed conductor section 13.

Note that the both types of gaps g1 and g2 are hereinafter referred to as gaps in the intermediate ends 12a and 12b of the coating tube 12.

The following will describe an example of a method for manufacturing the wire harness 1 of the present embodiment.

First, as a preparatory stage, the exposed conductor section 13 is formed at an intermediate section of the insulation-coated electrical wire W1, and then is bent so as to double back in a reverse direction to form a substantial U-shape, and the insulation-coated electrical wire W1 is bent substantially into two sections at a position in the vicinity of the exposed conductor section 13.

Figure 2:
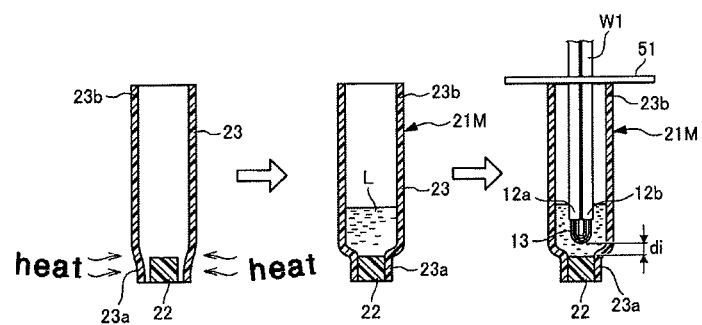
FIG. 2 illustrates a procedure from injection of a waterproofing agent after one end of a heat-shrinkable tube of a protection member of the waterproofing structure for an insulation-coated electrical wire according to the embodiment of the present invention has been thermally shrunk so as to closely fit to a stopper to immersion of an exposed conductor section of the insulation-coated electrical wire that is bent in a substantial U-shape in the waterproofing agent.

Furthermore, as shown on the left side of FIG. 2, a bottomed tubular member 21M for the protection member 21 is manufactured by heating the one end 23a of the heat-shrinkable tube 23 surrounding the stopper 22 with hot air or the like, so as to closely fit to the outer circumference of the stopper 22 on the inner circumference of the heat-shrinkable tube 23.

Then, as shown in the middle of FIG. 2, in the state in which the other end 23b of the heat-shrinkable tube 23 is directed upward in the vertical direction, a predetermined amount of a thermosetting epoxy resin liquid L (hereinafter, referred to as a waterproofing agent) of a two-component mixture, which is a material of the resin material 25, is injected into the tubular member 21M.

Then, the insulation-coated electrical wire W1 that has been subjected to the preparation step is inserted to a predetermined depth into the bottomed tubular member 21M, with the substantially U-shaped exposed conductor section 13 being directed downward, and is held at a predetermined height so that the exposed conductor section 13 is located at a predetermined distance di in the axial direction from the stopper 22 of the bottomed tubular member 21M.

At that time, the insulation-coated electrical wire W1 may be positioned at a predetermined insertion depth by mounting a clip 51 at a predetermined position in the axial direction of the insulation-coated electrical wire W1, inserting the insulation-coated electrical wire W1 into the bottomed tubular member 21M, and bringing the clip 51 into contact with the bottomed tubular member 21M. Then, the insulation-coated electrical wire W can be held reliably if it is held by holding means that is independent from the bottomed tubular member 21M.

Figure 3:
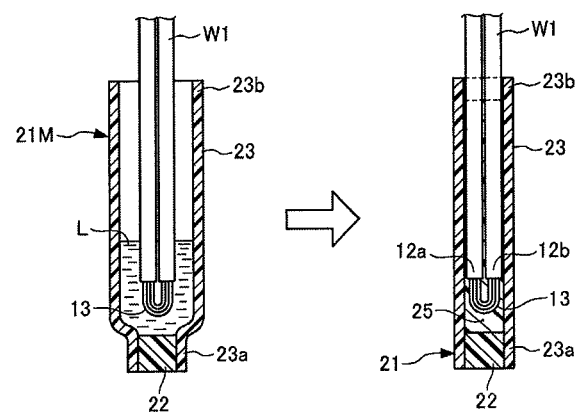
FIG. 3 illustrates a process of a stage in which in the waterproofing structure for an insulation-coated electrical wire according to the embodiment of the present invention, the entire protection member is heated in the state in which the exposed conductor section in the substantially U-shaped insulation-coated electrical wire is immersed in the waterproofing agent, and a layer of a cured thermosetting resin is formed as a waterproofing agent.
Figure 4:
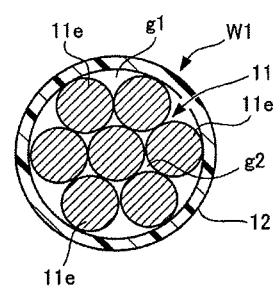
FIG. 4 is a transverse cross-sectional view of a part of the insulation-coated electrical wire of the wire harness having the waterproofing structure for an insulation-coated electrical wire according to the embodiment of the present invention.

Then, as shown in FIG. 3, the insulation-coated electrical wire W1 is inserted to a position of a predetermined insertion depth, the entire bottomed tubular member 21M in which the exposed conductor section 13 is immersed in the waterproofing agent is externally heated so that the heat-shrinkable tube section of the bottomed tubular member 21M is shrunk, and the thermosetting epoxy resin liquid L in the heat-shrinkable tube 23 is thermally cured.

At that time, first, the entire heat-shrinkable tube section of the bottomed tubular member 21M is thermally shrunk such that the diameter thereof is greatly reduced to thereby form the heat-shrinkable tube 23, and the fluid level of the thermosetting epoxy resin liquid L rises. When the entire heat-shrinkable tube 23 is shrunk to the extent that its diameter is close to a predetermined shrunk diameter, the thermosetting epoxy resin liquid L starts to thermally cure, and as a result, when the entire heat-shrinkable tube 23 is shrunk to the extent that its diameter is the predetermined shrunk diameter that is close to the shrinkage limit, the resin material 25 made from a layer of the cured thermosetting epoxy resin is formed.

Note that in FIGS. 1 and 3, the heat-shrinkable tube 23 in the step in which heat shrinkage of the heat-shrinkable tube 23 and thermal curing of the thermosetting epoxy resin are completed is shown in the shape of a substantially straight cylinder. However, a configuration is also possible in which a thermosetting epoxy resin that can be cured quickly is used so that the entire diameter of the heat-shrinkable tube 23 is greatly reduced with respect to that before the shrinkage but the outer diameter of the other end 23b is slightly larger than the outer diameter of the one end 23a.

The following will describe effects of the present embodiment.

According to the waterproofing structure for an insulation-coated electrical wire of the present embodiment configured as described above, since the insulation-coated electrical wire W1 is bent so as to double back in a reverse direction at the exposed conductor section 13 constituted by the plurality of bare wires, the operation of inserting, into the protection member 21 (bottomed tubular member 21M), the insulation-coated electrical wire W1 bent into two sections, with the exposed conductor section 13 that is doubled back at the tip, can be facilitated.

Furthermore, the exposed conductor section 13 of the insulation-coated electrical wire W1 is doubled back in a natural manner, and the intermediate ends 12a and 12b of the coating tube 12 that are adjacent to both ends of the exposed conductor section 13 are not pressed to contact the protection member 21 in the radial direction. Accordingly, an excellent outer appearance in the waterproofing structure can be achieved.

Furthermore, since the resin member 25 serving as a waterproofing agent can reliably closely fit to the circumferences of the exposed conductor section and the pair of intermediate ends of the coated tube that are adjacent to both ends of the exposed conductor section, and can easily penetrate into the gap g2 between the bare wires 11e in the exposed conductor section 13, and the gaps g1 and g2 between the bare wires lie in the intermediate ends 12a and 12b, making it possible to ensure a predetermined waterproofing performance without welding the electrical wires.

As a result, it is possible to realize a waterproofing structure for an insulation-coated electrical wire that has an excellent outer appearance and a high waterproofing performance, while achieving a reduction in cost for the wire harness 1 by simplification of the operation of inserting the electrical wire into the protection member 21.

Furthermore, in the present embodiment, since the tubular section 21a of the protection member 21 is constituted by the heat-shrinkable tube 23, and the closed section 21b of the protection member 21 is constituted by the stopper 22, it is possible to easily set the inner diameter of the heat-shrinkable tube 23 so as to be suitable for the operation of inserting an electrical wire into the protection member 21 according to the outer diameter of the stopper 22, while ensuring sufficient adhesion of the one end 23a of the heat-shrinkable tube 23 to the stopper 22. Accordingly, it is possible to ensure a better outer appearance and waterproofing performance.

Furthermore, in the present embodiment, a material of the resin member 25 may be a low-viscosity thermosetting epoxy resin of a two-component mixture that has a high adhesion to the circumference of the exposed conductor section 13 before it is thermally cured, and easily penetrates into the gaps g1 and g2 in the intermediate ends 12a and 12b of the coating tube 12. Therefore, it is possible to configure a reliable resin material 25 that has a high waterproofing performance and a high heat resistance, and is cured in the state of being closely fitted to the circumference of the exposed conductor section 13 and penetrating into the gaps g1 and g2 in the pair of intermediate ends 12a and 12b of the coating tube 12.

Since the wire harness 1 according to the present embodiment has the waterproofing structure for the insulation-coated electrical wire W1 that has the above-described configuration, the wire harness 1 is manufactured at a low cost, and has a high waterproofing performance and an excellent workability and outer appearance.

Accordingly, in the present embodiment, it is possible to provide a low-cost waterproofing structure for an insulation-coated electrical wire that can ensure a high waterproofing performance, and an excellent workability and outer appearance, and a low-cost wire harness 1 that has a high waterproofing performance and an excellent workability and outer appearance.

Note that in the foregoing embodiment, only a single insulation-coated electrical wire W1 having the intermediate exposed conductor section 13 bent in a substantial U-shape is inserted into the protection member 21, but another insulation-coated electrical wire having the intermediate exposed conductor section bent in a substantial U-shape, similarly to the insulation-coated electrical wire W1, may also be inserted to an insertion depth that is different from that of the insulation-coated electrical wire W1.

As described above, the present invention can provide a low-cost waterproofing structure for an insulation-coated electrical wire and a wire harness having this structure that can ensure a high waterproofing performance, and an excellent workability and outer appearance, and is useful in a waterproofing structure for an insulation-coated electrical wire that is effectively provided at an intermediate section of the insulation-coated electrical wire and in wire harnesses in general.

LIST OF REFERENCE NUMERALS

1 Wire harness
11 Conductor

11e Electrical wire
12 Coating tube
12a, 12b Intermediate end
13 Exposed conductor section
21 Protection member
21M Bottomed tubular material
21a Tubular section
21b Closed section
22 Stopper
23 Heat-shrinkable tube
23a One end
23b The other end
25 Resin material
25a One end surface
51 Clip
g1, g2 Gap
W1 Insulation-coated electrical wire

What is claimed is:

1. A waterproofing structure for an insulation-coated electrical wire comprising:
    a tubular protection member in which an exposed conductor section formed in a portion in the longitudinal direction of the insulation-coated electrical wire is accommodated together with a pair of intermediate ends of a coating tube of the insulation-coated electrical wire that are adjacent to the exposed conductor section; and
    a resin material that is accommodated in the protection member and cured while covering the exposed conductor section and the intermediate ends of the coating tube that are adjacent to the exposed conductor section,
    wherein the exposed conductor section in the protection member includes a plurality of bare wires that bend so as to double back in a reverse direction forming a U-shape together with the intermediate ends of the coating tube that are adjacent to the exposed conductor section,
    the protection member including a tubular section that surrounds the U-shaped exposed conductor section and the pair of intermediate ends of the coating tube that are adjacent to both ends of the exposed conductor section; and a closed section that is spaced from the U-shaped exposed conductor section in the axial direction and closes one end of the tubular section,
    the resin material is made of a thermosetting resin that is cured, between the protection member and the insulation-coated electrical wire, while closely contacting the closed section, the U-shaped exposed conductor section, and the pair of intermediate ends of the coating tube.

2. The waterproofing structure for an insulation-coated electrical wire according to claim 1,
    wherein the tubular section of the protection member is a heat-shrinkable tube that surrounds the pair of intermediate ends of the coating tube and the exposed conductor section, and is shrunk to a predetermined shrunk diameter, and
    the closed section of the protection member is a stopper that is closely fitted to the inner diameter of one end side of the heat-shrinkable tube.

3. The waterproofing structure for an insulation-coated electrical wire according to claim 1,
    wherein the resin material is made from a layer of a cured thermosetting epoxy resin of a two-component mixture.

4. A wire harness comprising the waterproofing structure for an insulation-coated electrical wire according to claim 1.

* * * * *